(12) United States Patent
Blouse et al.

(10) Patent No.: US 6,929,201 B1
(45) Date of Patent: Aug. 16, 2005

(54) ADJUSTABLE SPICE GRINDER

(75) Inventors: Gary D. Blouse, Oakland, CA (US); Manu Makhija, Castro Valley, CA (US)

(73) Assignee: AMS Industries, Inc., Oakland, CA (US)

( * ) Notice: Subject to any disclaimer, the term of this patent is extended or adjusted under 35 U.S.C. 154(b) by 0 days.

(21) Appl. No.: 10/784,599

(22) Filed: Feb. 23, 2004

(51) Int. Cl.[7] .......................... A01D 34/90; A47J 42/00; A47J 43/00
(52) U.S. Cl. ................... 241/169.1; 241/168; 241/169; 241/258; 241/259; 241/259.1
(58) Field of Search ................................ 241/168, 169, 241/169.1, 258, 259, 259.1

(56) References Cited

U.S. PATENT DOCUMENTS

| | | | | |
|---|---|---|---|---|
| 5,176,329 A | * | 1/1993 | De Coster et al. | 241/169.1 |
| 5,897,067 A | * | 4/1999 | Tardif et al. | 241/169.1 |
| 6,443,377 B1 | * | 9/2002 | Cheng | 241/169.1 |
| 6,851,635 B2 | * | 2/2005 | McCowin | 241/169.1 |

* cited by examiner

*Primary Examiner*—Derris H. Banks
*Assistant Examiner*—Jason Y Pahng
(74) *Attorney, Agent, or Firm*—Jack Lo

(57) ABSTRACT

A spice grinder is comprised of a mounting ring for screwing onto a spice container. An outer grinding member comprised of a ring is locked to the top of the mounting ring to prevent rotation. An inner grinding member comprised of a cone is positioned within the outer grinding member. A cap is positioned around the outer and inner grinding members, and rotationally fixed to the inner grinding member. An adjustment knob is attached to a shaft which is positioned through the cap and the inner and outer grinding members. A first spiral ramp under the knob is engaged against a second spiral ramp on the cap. An inner end of the knob is locked to the inner grinding member. Spring arms projecting radially from the inner grinding member are biased against an inner surface of the cap. Coarseness is adjusted by rotating the knob.

11 Claims, 4 Drawing Sheets

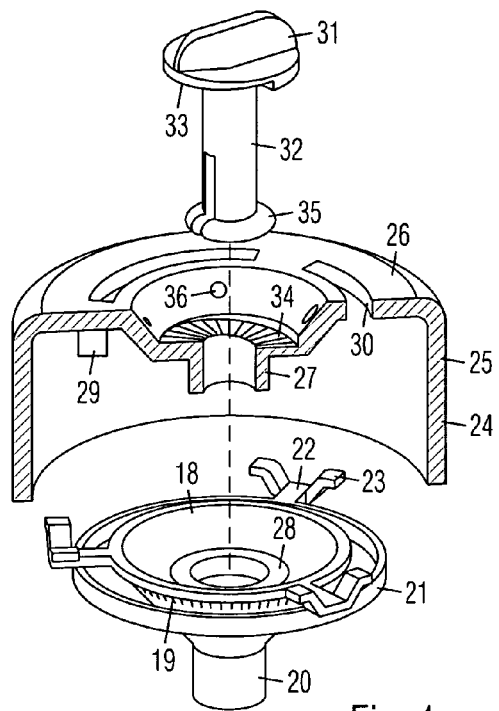
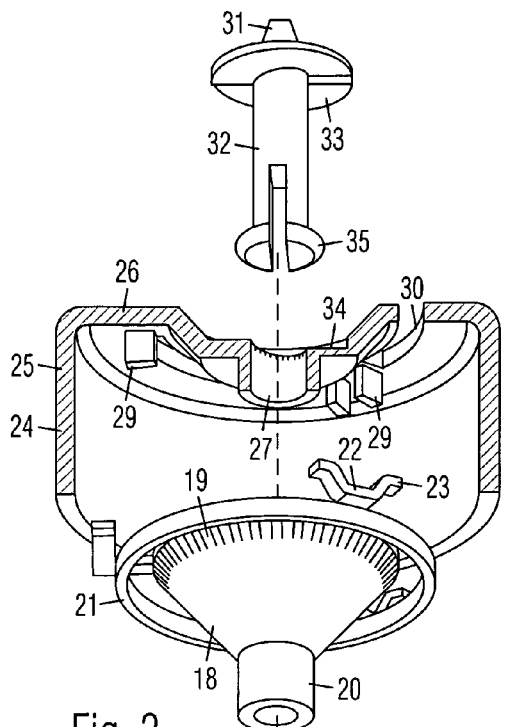
Fig. 1
Fig. 2
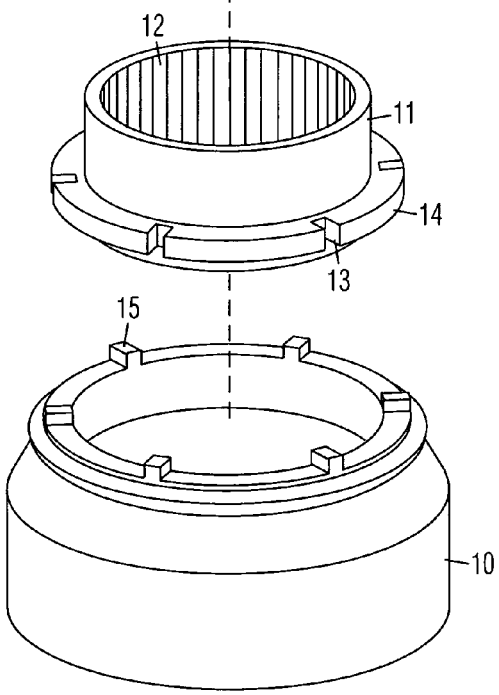
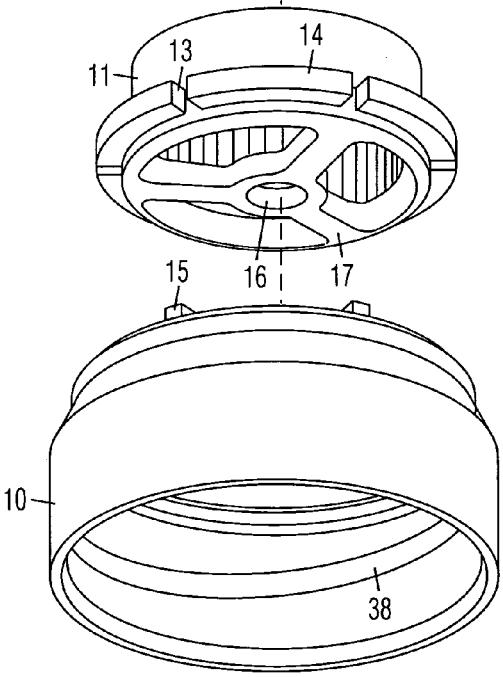

ADJUSTABLE SPICE GRINDER

BACKGROUND OF THE INVENTION

1. Field of the Invention

The invention broadly relates to spice grinders.

2. Prior Art

A typical spice grinder is comprised of a ring positioned at an end of a spice container. A rotatable cone is positioned within the ring, and connected to a knob or crank at another end of the container for rotation. The ring and the cone have opposing serrated surfaces. Spice wedged in an annular gap between the ring and the cone is crushed into small grains when the cone is rotated. Some grinders have an axial screw connected to the cone along its rotational axis for adjusting the gap size and thus the coarseness of the grind. However, the cone is loosely positioned inside the ring when adjusted for a coarse grind, so that it wobbles during grinding to produce inconsistent grains.

BRIEF SUMMARY OF THE INVENTION

The objects of the present spice grinder are:

to grind a spice into smaller grains;
to be adjustable for coarseness;
to indicate the selected coarseness;
to produce more consistently sized grains for any selected coarseness;
to prevent the grinder from being twisted off the spice container during grinding;
to be relatively simple to manufacture.

The present spice grinder is comprised of a threaded mounting ring for screwing onto a threaded spice container. An outer grinding member comprised of a ring with a serrated internal surface is locked to the top of the mounting ring to prevent rotation. An inner grinding member comprised of a cone with a serrated external surface is positioned within the outer grinding member to form a tapered annular gap in between. A centering ring attached around the inner grinding member is positioned around the outer grinding member to align the inner grinding member within the outer grinding member. A cap is positioned around the outer and inner grinding members, and rotationally fixed to the inner grinding member. An adjustment knob is attached to a shaft which is positioned through the cap and the inner grinding member. A first spiral ramp under the knob is engaged against a second spiral ramp on the cap. An inner end of the knob is locked to the inner grinding member. Spring arms projecting radially from the inner grinding member are biased against an inner surface of the cap. When the knob is rotated, the shaft is moved axially to adjust the gap between the inner and outer grinding members for adjusting coarseness.

BRIEF DESCRIPTION OF THE SEVERAL VIEWS OF THE DRAWING

FIG. 1 is a top perspective exploded view of the present adjustable spice grinder.

FIG. 2 is a bottom perspective exploded view of the present adjustable spice grinder.

DETAILED DESCRIPTION OF THE INVENTION

Figure 3:
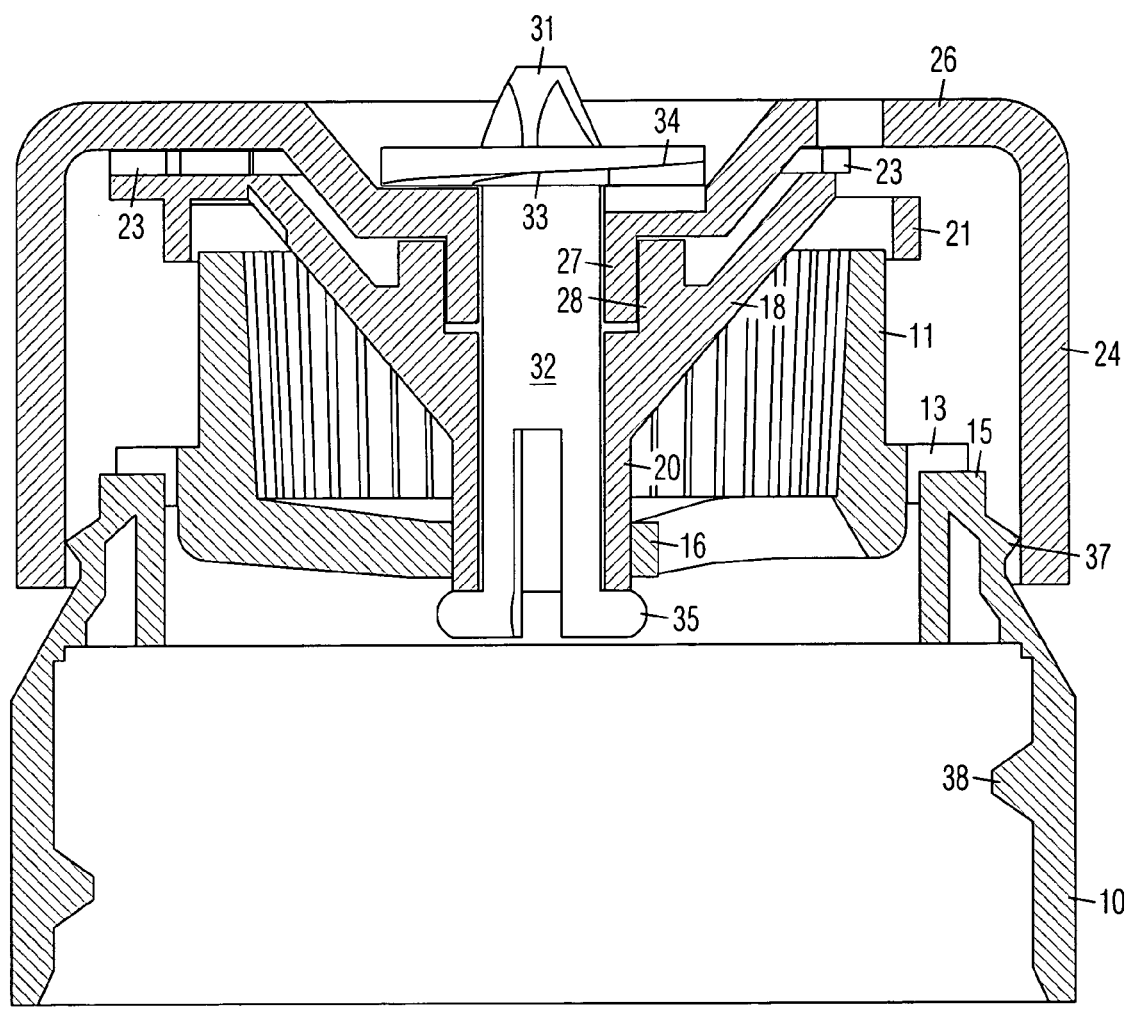
FIG. 3 is a side sectional view thereof assembled and adjusted for maximum grain size.

FIGS. 1–2:

A preferred embodiment of the present adjustable spice grinder is shown in a top perspective exploded view in FIG. 1 and a bottom perspective exploded view in FIG. 2. It is comprised of a mounting ring 10 with internal threads 38 for screwing onto an externally threaded spice container (not shown). Alternatively, mounting ring 10 may snap onto the spice container instead of being screwed on, or may be an integral part of the spice container.

An outer grinding member 11 comprised of a ring or tube with a serrated internal surface 12 is rotationally locked to an outer end of mounting ring 10 to prevent rotation, preferably by slots 13 on a flange 14 around outer grinding member 11 are positioned to mate with tabs 15 that project from the outer end of mounting ring 10. A bearing 16 is concentrically positioned within outer grinding member 11 by arms 17. An inner grinding member 18 is cone shaped with a serrated external surface 19 is for positioning within outer grinding member 11 to form a tapered annular gap there between. The gap is tapered from a wider end nearer mounting ring 10 to a narrower end away from mounting ring 10. A sleeve 20 projecting from an inner end of inner grinding member is arranged to be positioned in bearing 16.

A centering ring 21 is concentrically attached around inner grinding member 18. Centering ring 21 is for positioning around outer grinding member 11 to axially align inner grinding member 18 within outer grinding member 11. Centering ring 21 reduces the manufacturing tolerances of the other parts which would otherwise have to be accurately made to ensure the alignment of inner grinding member 18 within outer grinding member 11. Arms 22 projecting radially from inner grinding member 18 connect centering ring 21 thereto. Leaf springs 23 are connected to the ends of arms 22.

A cap 24 is for positioning around outer and inner grinding members 11 and 18, and is comprised of a cylinder 25 with a face plate 26 at an outer end. Cap 24 is centered around inner grinding member 18 by a concentric sleeve 27 projecting inwardly for positioning within a sleeve 28 on an outer end of inner grinding member 18. Cap 24 is rotationally locked to inner grinding member 18, preferably by tabs 29 on an inner side of cap 24 which engage arms 22 on inner grinding member 18. Spice dispensing 30 slots are positioned on face plate 26 of cap 24.

An adjustment knob 31 is attached to an outer end of a shaft 32 for positioning through sleeve 27 of cap 24 and sleeve 28 of inner grinding member 18. A first serrated spiral ramp 33 under knob 31 around shaft 32 is for engaging a second serrated spiral ramp 34 on face plate 26 of cap 24 opposite sleeve 27. An inner end of knob 31 is locked to inner grinding member 18, preferably by spring hooks 35. Spring arms 22 on inner grinding member 18 are for biasing against an inner surface of cap 24. When knob 31 is rotated, it is moved axially to adjust the gap between inner and outer grinding members 18 and 11 to adjust the coarseness. Coarseness indicia 36 on face plate 26 around knob 31 indicates the selected coarseness.

FIG. 3:

The spice grinder is shown assembled in FIG. 3. Outer grinding member 11 is locked to the outer end of mounting ring 10, wherein tabs 15 on mounting ring 10 are positioned in slots 13 in flange around outer grinding member 11. Inner grinding member 18 is positioned inside outer grinding member 11 to define a tapered gap there between. Cap 24 is positioned around inner and outer grinding members 18 and 11. An inner end of cap 24 is centered around mounting ring 10 by a lip 37 around an outer end of mounting ring 10. Sleeve 27 on the inside of cap 24 is positioned within sleeve 28 on the outer side of inner grinding member 18. Sleeve 20 on inner side of inner grinding member 18 is positioned in bearing 16 attached to outer grinding member 11. Centering ring 21 is positioned around outer grinding member 11 to axially align inner grinding member 18 within outer grinding member 11 for consistent grain size.

Shaft 32 attached to knob 31 is positioned through sleeves 20, 27 and 28, and locked to the inner end of sleeve 20 by expanding hooks 35 at its inner end. Serrated spiral ramp 33 under knob 31 is engaged with serrated spiral ramp 34 on face plate 26 of cap 24. When knob 31 is rotated, shaft 32 is moved axially by ramps 33 and 34, and inner grinding member 18 is moved axially relative to outer grinding member 11 to adjust the gap size. Springs 23 are biased against the inner side of face plate 26 of cap 24, so that inner grinding member 18 and knob 31 are biased inwardly to maintain the selected gap size and ensure consistent grain size. In FIG. 3, knob 31 is rotated to position shaft 32 at its most outward position for maximum gap size to produce larger grains.

Figure 4:
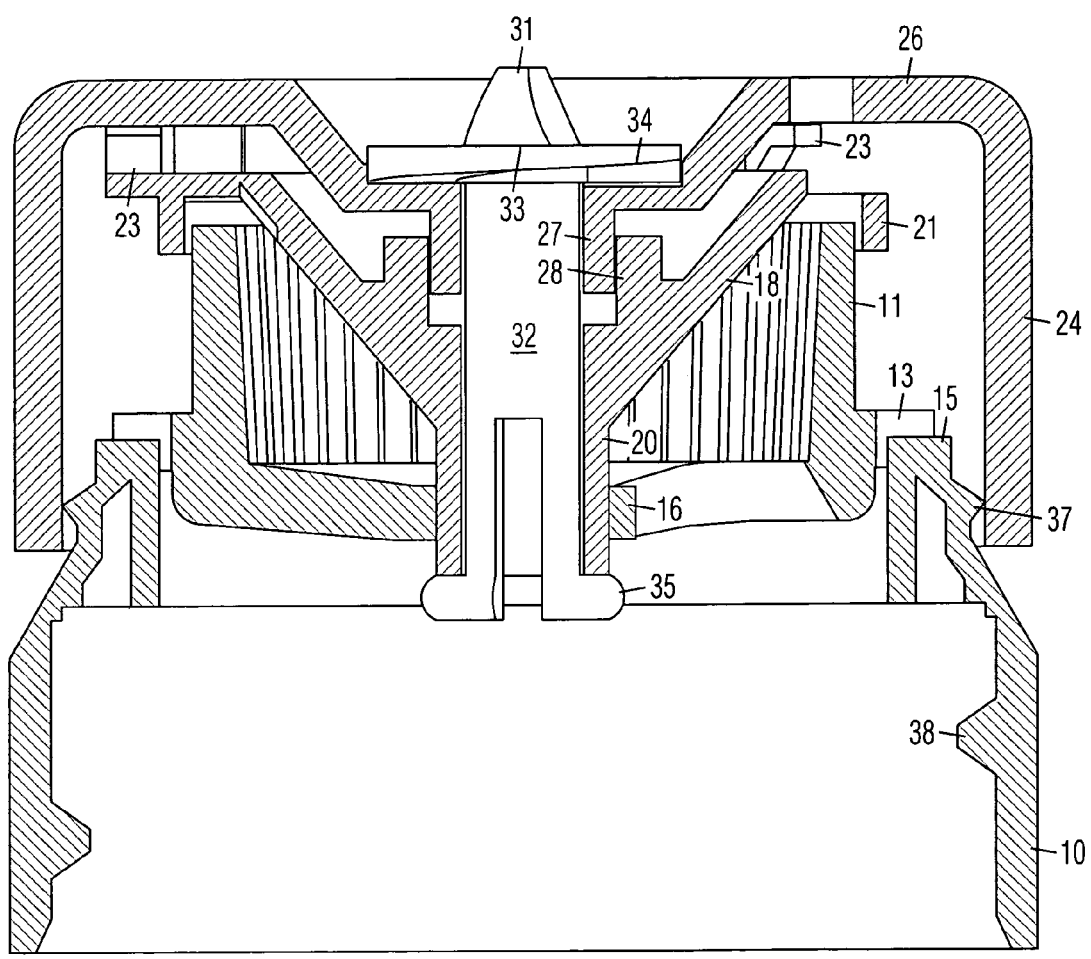
FIG. 4 is a side sectional view thereof assembled and adjusted for minimum grain size.

FIG. 4:

Knob 31 is shown in FIG. 4 rotated to position shaft 32 at its most inward position for minimum gap size to produce smaller grains.

Figure 5:
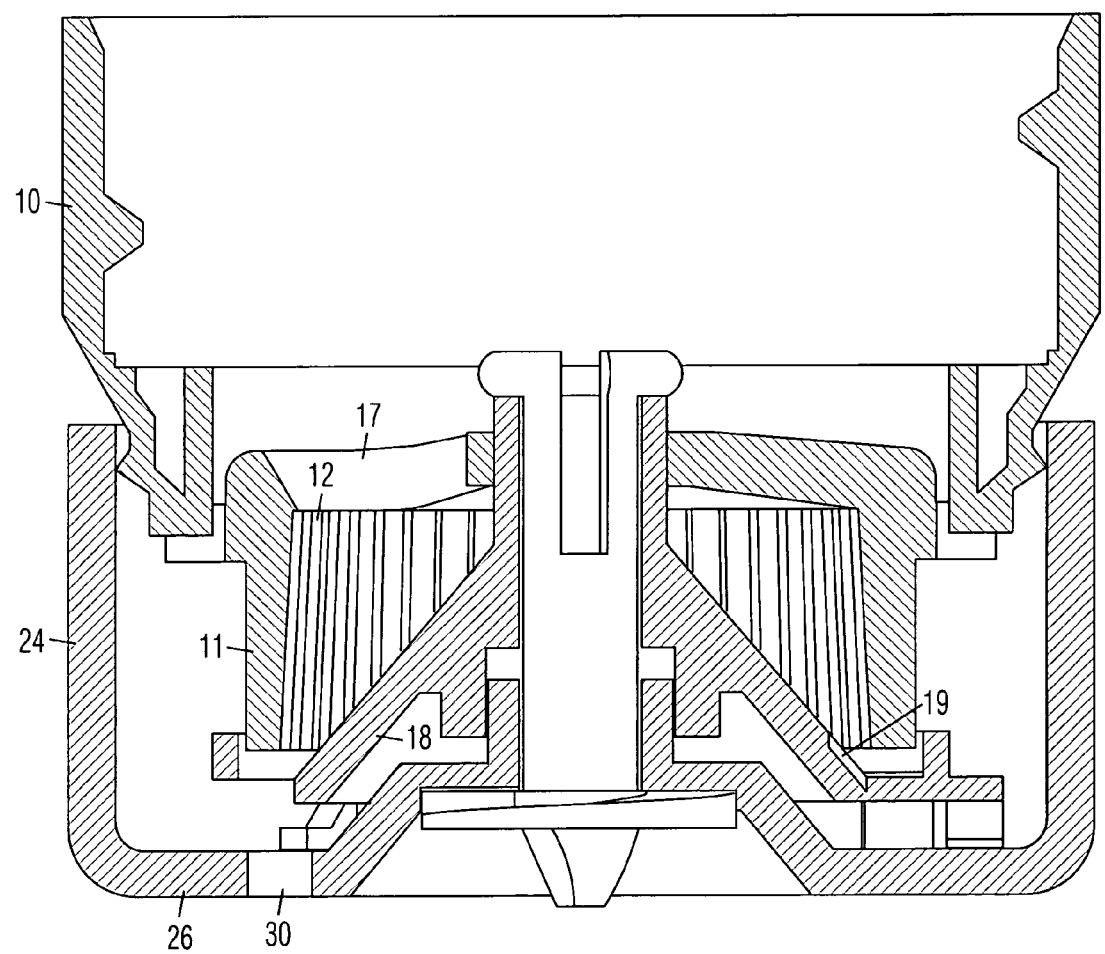
FIG. 5 is a side sectional view thereof positioned for grinding.

FIG. 5:

The spice grinder is shown inverted in FIG. 5 for grinding. Spice falls between arms 17 into the gap between inner and outer grinding members 18 and 11. Rotating cap 24 relative to mounting ring 10 or the spice container (not shown) rotates inner grinding member 18 relative to outer grinding member 11 to grind the spice between their serrated surfaces 12 and 19, which are angled to permit grinding only in the same direction required for tightening mounting ring 10 on the spice container. Ground spice particles fall out through slots 30 in face plate 26 of cap 24. The spice path is indicated by the dashed arrow.

Although the foregoing description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

We claim:

1. An adjustable spice grinder, comprising:
   a stationary outer grinding member comprised of a ring with a serrated internal surface;
   a rotatable inner grinding member with a serrated external surface positioned within said outer grinding member to form a tapered annular gap there between;
   a cap comprised of a face plate attached to an outer end of a cylinder positioned around said outer grind member and said inner grinding member, wherein said cap is rotationally locked to said inner grinding member;
   spice dispensing slots positioned on said face plate of said cap;
   an adjustment knob attached to an outer end of a shaft positioned through said cap and said inner grinding member, wherein an inner end of said shaft is axially secured to said inner grinding member;
   a spring biasing said inner grinding member toward an inner end of said shaft;
   a first spiral ramp connected to said knob and engaging a second spiral ramp connected to said cap; and
   wherein when said knob is rotated, said knob is moved axially to move said inner grinding member relative to said outer grinding member to adjust said gap for adjusting grind coarseness.

2. The adjustable spice grinder of claim 1, wherein said inner grinding member is comprised of a cone.

3. The adjustable spice grinder of claim 1, further including a centering ring concentrically attached around said inner grinding member, wherein said centering ring is positioned around said outer grinding member to axially align said inner grinding member within said outer grinding member.

4. The adjustable spice grinder of claim 1, further including a threaded mounting ring for attaching to a threaded spice container, wherein said mounting ring is rotationally fixed to said outer grinding member.

5. The adjustable spice grinder of claim 1, further including a threaded mounting ring for attaching to a threaded spice container, wherein said mounting ring is rotationally fixed to said outer grinding member, and said serrated internal surface of said outer grinding member and said serrated external surface of said inner grinding member are directional for grinding only in a direction matching a direction for tightening said mounting ring onto said spice container.

6. The adjustable spice grinder of claim 1, further including coarseness indicia on said face plate around said knob for indicating selected coarseness.

7. The adjustable spice grinder of claim 1, wherein said first spiral ramp and said second spiral ramp are serrated for maintaining relative positioning thereof.

8. An adjustable spice grinder, comprising:
   a stationary outer grinding member comprised of a ring with a serrated internal surface;
   a rotatable inner grinding member with a serrated external surface positioned within said outer grinding member to form a tapered annular gap there between;
   a centering ring concentrically attached around said inner grinding member, wherein said centering ring is positioned around said outer grinding member to axially align said inner grinding member within said outer grinding member;
   a cap comprised of a face plate attached to an outer end of a cylinder positioned around said outer grind member and said inner grinding member, wherein said cap is rotationally locked to said inner grinding member;
   spice dispensing slots positioned on said face plate of said cap;
   an adjustment knob attached to an outer end of a shaft positioned through said cap and said inner grinding member, wherein an inner end of said shaft is axially secured to said inner grinding member;
   coarseness indicia on said face plate around said knob for indicating selected coarseness;
   springs connected to said inner grinding member and biased against an inner surface of said cap to bias said inner grinding member toward an inner end of said shaft;

a first spiral ramp connected to said knob and engaging a second spiral ramp connected to said cap, wherein said first spiral ramp and said second spiral ramp are serrated for maintaining relative positioning thereof; and wherein when said knob is rotated, said knob is moved axially to move said inner grinding member relative to said outer grinding member to adjust said gap for adjusting grind coarseness.

9. The adjustable spice grinder of claim 8, wherein said inner grinding member is comprised of a cone.

10. The adjustable spice grinder of claim 8, further including a threaded mounting ring for attaching to a threaded spice container, wherein said mounting ring is rotationally fixed to said outer grinding member.

11. The adjustable spice grinder of claim 8, further including a threaded mounting ring for attaching to a threaded spice container, wherein said mounting ring is rotationally fixed to said outer grinding member, and said serrated internal surface of said outer grinding member and said serrated external surface of said inner grinding member are directional for grinding only in a direction matching a direction for tightening said mounting ring onto said spice container.

* * * * *